Patented Oct. 21, 1941

2,259,455

UNITED STATES PATENT OFFICE 2,259,455

MANUFACTURE OF WATER-INSOLUBLE ARTIFICIAL RESINS

Gottfried Caro, Bitterfeld, Alfred Rieche, Wolfen, Kreis Bitterfeld, Walter Rudolph, Bitterfeld, and Hans Wassenegger, Dessau in Anhalt, Germany No Drawing. Application March 25, 1939, Serial No. 264,232. In Germany April 6, 1938

6 Claims. (Cl. 260—49)

The present invention relates to the manufacture of water-insoluble artificial resins from phenols, aldehydes and ingredients of the sulphite cellulose waste liquor.

It is known that sulphite cellulose waste liquor contains substances which may be condensed with phenols and aldehydes so as to form resinous masses. The waste liquor has hitherto been used for the condensation either directly or after being freed from calcium by means of sodium carbonate. However, numerous drawbacks arise from the fact that, besides the lignine substance proper, the sulphite cellulose waste liquor contains large amounts of other constituents, such as sugar, aliphatic acids, humus substances, degradation products of lignine and low-molecular lignine-sulphonic acids which do not yield stable condensation products. Only 50–60% of the dry substances are lignine-sulphonic acid. Since the other ingredients take part equally in the condensation, there are obtained very contaminated resins. Proposals have been made to remove the sugar by fermentation, but even with this method of working the troublesome impurities enter the condensation product.

The present invention relates to the observation that considerably purer condensation products having a better resistance especially towards water and solvents are obtained by using free lignine-sulphonic acids or the alkali salts thereof obtained by way of the basic calcium salt. Such products are obtained by decomposition of the basic calcium salt with acids, such as sulfuric or oxalic acid or their acid salts or with carbon dioxide and alkali carbonates. In particular, there may be chosen certain fractions of lignine-sulphonic acids. There may be used the lignine-sulphonic acids of all kinds of wood, preferably that of beech-wood.

The condensation may be effected by means of mono- and/or poly-hydric phenols, phenol-carboxylic acids or phenol-sulphonic acids, and aldehydes such as formaldehyde or equivalents thereof or compounds yielding an aldehyde such as hexamethylene-tetramine. In most cases, the condensation occurs very quickly and without application of pressure and high temperatures. The usual catalysts may be used.

Depending upon the conditions of reaction, the condensation products are obtained in the form of gelatinous or solid, pulverizable masses. If the jellies are cautiously dried without destroying the gel structure, there are obtained resins which have cation exchanging properties, that is hydrogen or metal ion exchangers depending upon the kind of the charge possessed. Thus, resorcinol, formaldehyde and lignine-sulphonic acid yield, without a catalyst, a jelly which, after cautious drying, displays a high base exchange effect. If the same mixture is condensed with the addition, for instance, of hexamethylene-tetramine, a solid, pulverizable mass is formed.

Such artificial resins may, quite generally, be moulded at a high temperature so as to obtain pressed articles, the resins thereby undergoing a subsequent condensation. Usual ingredients such as softening agents and filling materials may be incorporated with the masses. The products may also be used as filling materials for other known moulded plastics.

The following examples illustrates the invention, the parts being by weight, unless otherwise stated:

(1) 22 parts of resorcinol are dissolved in 400 parts of a solution of 50% strength of lignine-sulphonic acid prepared from basic calcium lignine-sulphonate, and 80 parts by volume of a formaldehyde solution of 32% strength are rapidly introduced, while stirring. Self-heating occurs and the mixture soon solidifies so as to form a gelatinous mass which is further heated, for a short time, on the vapour bath. The product is dried under reduced pressure at a temperature of 50° C. and introduced into water, whereby it flies into pieces. The product is washed with water then with 5 N-hydrochloric acid until it becomes colourless. Thereupon, it is again washed with water until constantly neutral. The product thus obtained displays a good base exchange effect.

(2) 80 parts by volume of a formaldehyde solution of 32% strength are mixed with 113 parts of a solution of about 31% strength of para-phenol-sulphonic acid and 120 parts of a solution 50% strength of lignine-sulphonic acid prepared from basic calcium lignine-sulphonate. After a three hours' heating on the vapour bath, a jelly is obtained which is worked up as indicated in example 1.

(3) A solution of 50% strength of lignine-sulphonic acid prepared from basic calcium lignine-sulphonate is heated on the vapour bath and there are introduced 28 parts of salicylic acid and 80 parts by volume of a formaldehyde solution of 32% strength. After a seven hours' heating, there is obtained a viscous mass which, on cooling, has the consistency of a jelly. It is worked up as indicated in example 1.

The condensations which are described in examples 5 to 7 and which lead to base exchangers may also be carried out with purified sodium lignine-sulphonate. In this case, the condensation takes a longer period of time.

The present invention has nothing in common with the manufacture of water-soluble tanning agents from lignine-sulphonic acid, phenols and formaldehyde. Contrary thereto, the present case is concerned with water-insoluble resins, the manufacture of which is performed in known manner but with larger amounts of formaldehyde and wherein the ratio of lignine-sulphonic acid to phenol is displaced, as a rule, in favour of the latter.

The invention is of course not limited to the specific details described, for obvious modifications may occur to a person skilled in the art.

What we claim is:

1. A process for manufacturing base exchange bodies which consists in condensing in aqueous solution, in the absence of a catalyst, a phenol selected from the class consisting of resorcinol, phenol sulfonic acid and salicylic acid, formaldehyde and a substance selected from the class consisting of lignine-sulfonic acid and its alkali salts, obtained by precipitating basic calcium salts of lignine-sulfonic acid from sulfite waste liquor and acidifying said salts, until a water-insoluble gel is obtained, carefully drying said gel to retain its gel structure and washing said gel until it is neutral.

2. The process as defined in claim 1, wherein an alkaline metal salt of the lignine-sulfonic acid is employed.

3. The process as defined in claim 1, wherein the phenol is resorcinol.

4. The process as defined in claim 1, wherein the phenol is para-phenol-sulfonic acid.

5. The process as defined in claim 1, wherein the phenol is salicylic acid.

6. Water-insoluble artificial resins prepared according to claim 1.

GOTTFRIED CARO.
ALFRED RIECHE.
WALTER RUDOLPH.
HANS WASSENEGGER.